United States Patent
Krishan

(10) Patent No.: US 12,212,629 B2
(45) Date of Patent: Jan. 28, 2025

(54) APPLICATION-LAYER CONNECTION REDISTRIBUTION AMONG SERVICE INSTANCES

(71) Applicant: Oracle International Corporation, Redwood City, CA (US)

(72) Inventor: Rajiv Krishan, Cary, NC (US)

(73) Assignee: Oracle International Corporation, Redwood City, CA (US)

( * ) Notice: Subject to any disclaimer, the term of this patent is extended or adjusted under 35 U.S.C. 154(b) by 95 days.

(21) Appl. No.: 18/298,010

(22) Filed: Apr. 10, 2023

(65) Prior Publication Data
US 2024/0340346 A1    Oct. 10, 2024

(51) Int. Cl.
*H04L 67/141*    (2022.01)
*H04L 41/5003*   (2022.01)
*H04L 67/143*    (2022.01)

(52) U.S. Cl.
CPC ........ *H04L 67/141* (2013.01); *H04L 41/5003* (2013.01); *H04L 67/143* (2013.01)

(58) Field of Classification Search
CPC .. H04L 41/5003; H04L 67/141; H04L 67/143
See application file for complete search history.

(56) References Cited

U.S. PATENT DOCUMENTS

| | | | |
|---|---|---|---|
| 9,294,558 B1 | 3/2016 | Vincent et al. | |
| 10,778,585 B1* | 9/2020 | Saalfeld | H04L 67/148 |
| 10,909,088 B2* | 2/2021 | Colrain | G06F 16/21 |
| 11,943,093 B1* | 3/2024 | Brooker | H04L 41/0654 |
| 2019/0141140 A1 | 5/2019 | Bal et al. | |

OTHER PUBLICATIONS

Extended European Search Report for EP App. No. 24169464.5 mailed by EPO on Aug. 14, 2024, Examiner Aura Marcos, F, 11 pages.

* cited by examiner

*Primary Examiner* — James E Springer
*Assistant Examiner* — Patrick F Ngankam

(57) ABSTRACT

The technology disclosed herein enables redistribution of connections between service instances by determining a subset of the connections and terminating the subset. In a particular example, a method includes determining connection information about connections established with service instances operating in an active-active configuration. The connection information identifies directions of connection initiation for the connections and identifies peers for the connections. Based on the connection information, the method includes determining a subset of the connections for reestablishment on a per-peer basis using direction-dependent criteria and terminating the subset of the connections.

20 Claims, 7 Drawing Sheets

APPLICATION-LAYER CONNECTION REDISTRIBUTION AMONG SERVICE INSTANCES

BACKGROUND

A long-lived application-layer connection is a connection that remains open for longer than necessary to perform a single transaction, or a set of sequential/parallel transactions, over the connection. Some common application-layer connection protocols include Hypertext Transfer Protocol (HTTP), HTTP2, and Diameter. Given that a long-lived connection is expected to stay active until a client or server terminates the connection (e.g., due to protocol or local/operator policy), it can be difficult to properly load balance multiple long-lived connections that have already been established. For example, a service provider may supply multiple service instances (e.g., servers, virtual machines, containers, pods, etc.—including combinations thereof) in an active-active configuration. In an active-active configuration, long-lived connections can be established between any of those service instances and peers (e.g., client systems).

Over time other connections may be established and taken down, more service instances may be added and removed (e.g., added for capacity and removed due to failure), or other events may take place that change the distribution of connections across the service instances. Some service instances may end up having many connections while other service instances have few or even none. Absent redistribution logic capable of moving connections from one instance to another, the service provider can only rely on its ability to distribute newly initiated connections while waiting for peers/instances to terminate already established connections on their own accord. In the meantime, connections established with service instances having higher connection loads may experience adverse service effects, such as higher latency and traffic discards, while other service instances are underutilized.

SUMMARY

The technology disclosed herein enables redistribution of connections among service instances by determining a subset of the connections and terminating the subset. In a particular example, a method includes determining connection information about connections established with service instances operating in an active-active configuration. The connection information identifies directions of connection initiation for the connections and identifies peers for the connections. Based on the connection information, the method includes determining a subset of the connections for reestablishment on a per-peer basis using direction-dependent criteria and terminating the subset of the connections.

In other examples, an apparatus performs the above-recited method and program instructions stored on computer readable storage media direct a processing system to perform the above-recited method.

DETAILED DESCRIPTION

Terminating an application-layer connection between a peer and a service instance operating in an active-active configuration with like service instance forces establishment of a new connection should communications need to continue between the peer and one of the active-active service instances. When the peer initiates the new connection, a load balancer associated with the active-active service instances may select one of the service instances to satisfy a load-balancing scheme implemented by the load balancer (e.g., may select a service instance having fewer connections that other ones of the service instances). Similarly, if one of the service instances is to initiate the new connection, a controller of the service instances may select a service instance that satisfies a load balancing scheme to initiate the new connection. In both of the above scenarios, establishing a new connection provides the peer with an opportunity to be connected to a different service instance.

While randomly terminating connections may eventually result in re-established connections being better distributed across the service instances, it is more beneficial to selectively terminate connections. A connection with a service instance that has few or no other connections likely would not benefit from being terminated to trigger establishment of a new connection. In a general sense, connections with service instances having a greater number of connections than other service instances should have their connections terminated so that new connections may be more evenly distributed during establishment.

Figure 1:
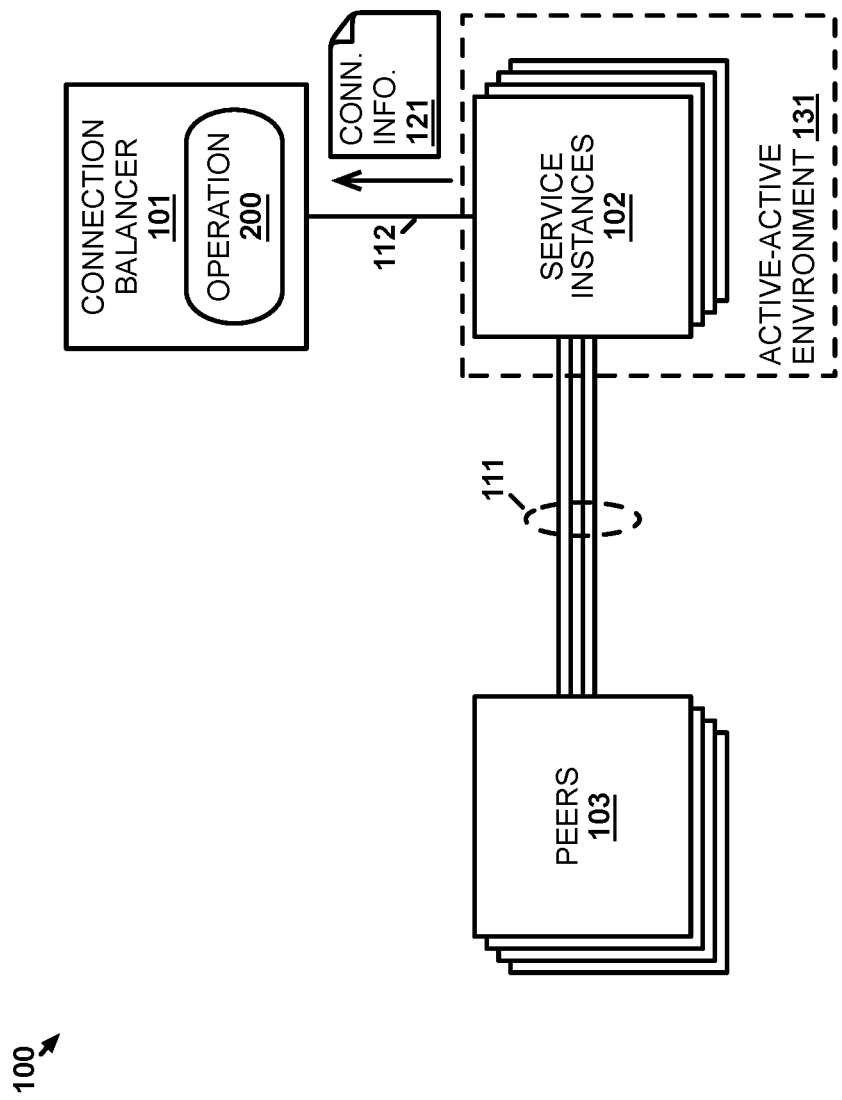
FIG. 1 illustrates an implementation for redistributing application-layer connections with peers between service instances.

FIG. 1 illustrates implementation 100 for redistributing application-layer connections with peers between service instances. Implementation 100 includes connection balancer 101, service instances 102, and peers 103. Connection balancer 101 and service instances 102 communication over respective communication links 112. Communication links 112 may be wired and/or wireless links and may be direct links or may include intervening systems, networks, and/or devices. In some examples, communication links 112 may be logical links between connection balancer 101 and service instances 102 implemented on physical networking and computing hardware. Connections 111 are application-layer connections between peers 103 and service instances 102 over communication links, which may be similar to communication links 112. Connections 111 may be established using HTTP2, diameter, or some other application-layer connection protocol.

In operation, service instances 102 include two or more service instances in an active-active configuration, which is referred to as active-active environment 131 in this example. Service instances 102 may be physical computing systems, virtual machines, containers, pods, or some other type of physical or virtualized computing component with which application-layer connections may be established—including combinations thereof. Service instances 102 are each configured to provide the same service(s) to connected peers. The active-active configuration of service instances 102 enables peers 103 to connect with any one of service instances 102 to access the service(s) provided thereby. In some examples, a load balancer may be used in active-active environment 131 to distribute, or "balance," incoming connections from peers 103 among service instances 102. Similarly, a controller for active-active environment 131 may select particular ones of service instances 102 to initiate new connections to peers 103.

Peers 103 include one or more endpoints to connections 111. Each of connections 111 includes one of peers 103 as one endpoint and one of service instances 102 as the other endpoint. Individual ones of peers 103, like service instances 102, may be endpoints to multiple ones of connections 111. Peers 103 may include physical computing systems, virtual machines, containers, pods, or some other type of physical or virtualized computing component with which application-layer connections may be established—including combinations thereof. In an example, peers 103 may include computing devices wirelessly communicating over a fifth-generation (5G) cellular communication network. Service instances 102 may be network functions implemented by an operator of the 5G network to provide application-layer communication services to peers 103 via connections 111. Given the size of many 5G networks, the number of peers 103 and connections 111 with service instances 102 can be very large, which increases the likelihood that issues may arise (e.g., greater latency, communication traffic being discarded, etc.) when connections 111 are unevenly distributed across service instances 102.

Connection balancer 101 is a computing component, such as a physical computing system, virtual machine, container, pod, or some other type of physical or virtualized computing component capable of communicating with service instances 102—including combinations thereof. While shown as a single element, connection balancer 101 may be distributed across multiple computing components. Similarly, although connection balancer 101 is shown outside of active-active environment 131, connection balancer 101 may be considered part of active-active environment 131. Connection balancer 101 performs operation 200 to redistribute connections 111 with peers 103 among service instances 102. Instead of moving an existing connection of connections 111 from one of service instances 102 to another, connection balancer 101 terminates the existing connection, which allows for establishment of a new connection between the affected peer of peers 103 (i.e., the peer that was the endpoint of the terminated connection) and the other service instance. Even though the original connection is not maintained, operation 200 still results in redistribution of a connection between the peer and service instances 102.

Figure 2:
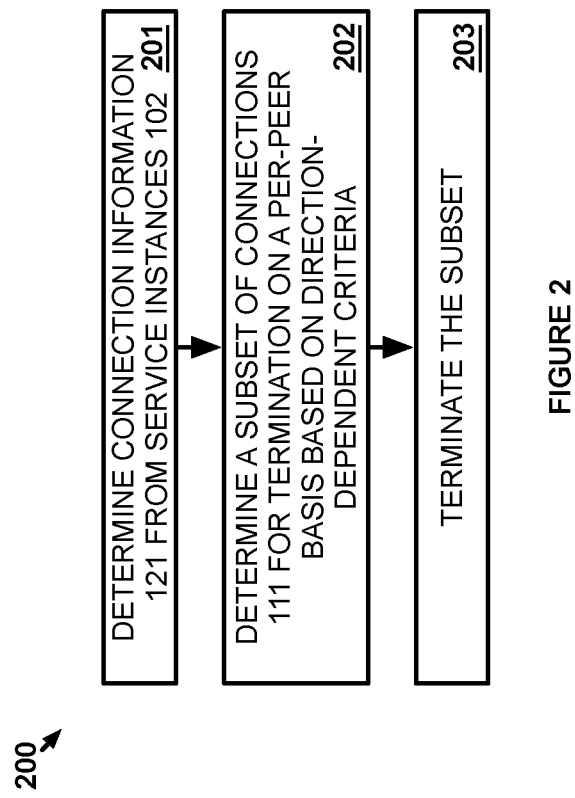
FIG. 2 illustrates an operation to redistribute application-layer connections with peers between service instances.

FIG. 2 illustrates operation 200 to redistribute application-layer connections with peers between service instances. Operation 200 may be performed periodically (e.g., upon elapsing of a predefined time period since last performed, on a predetermined schedule, etc.), may be performed upon a trigger condition being met (e.g., upon a difference threshold being met between the number of connections serviced by the most loaded and least loaded service instances), may be performed in response to a user instruction, or there may be some other impetus to perform operation 200. Each time operation 200 is performed, connection balancer 101 can account for the current situation surrounding connections 111, service instances 102, and peers 103. For example, a new service instance may be instantiated between two performances of operation 200. Even if connections 111 were redistributed across the number of service instances 102 that existed during one performance of operation 200, existence of the new service instance may support additional redistribution during a subsequent performance of operation 200 (e.g., the new service instance may be servicing fewer of connections 111 than other service instances when operation 200 is subsequently performed).

During operation 200, connection balancer 101 determines connection information 121 about connections 111 (201). In implementation 100, connection information 121 is shown as being received from service instances 102 over communication links 112. Connection balancer 101 may poll each of service instances 102 for a portion of connection information 121 pertaining to those of connections 111 established with the respective service instance, service instances 102 may be configured to update connection balancer 101 with their respective portions of connection information 121, or some other mechanism may be used to retrieve connection information 121 from service instances 102. In other examples, connection information 121 may be received from a different component of active-active environment 131, such as a controller/orchestrator for active-active environment 131, that maintains connection information 121. In some examples, connection balancer 101 may communicate with a controller/orchestrator of active-active environment 131 to identify service instances 102 prior to receiving connection information 121. The controller/orchestrator identifies service instances 102 in a manner that enables connection balancer 101 to contact service instances 102 over communication links 112 (e.g., by providing network addresses of each of service instances 102). In a specific example, Kubernetes may be a container orchestration platform that facilitates operation of active-active environment 131, with each of service instances 102 being a pod of one or more containers. Connection balancer 101 may contact the Kubernetes control plane for active-active environment 131 to identify the pods operating in active-active environment 131.

Connection information 121 identifies directions of connection initiation for connections 111 and identifies peers 103 for connections 111. In other words, based on connection information 121, connection balancer 101 knows which respective peer of peers 103 is an endpoint for a respective one of connections 111. Likewise, based on the directions of connection initiation, connection balancer 101 knows whether the peer or the service instance to which the peer is connected initiated the connection. A peer may be identified by a fully qualified domain name (FQDN) of the peer, an Internet Protocol (IP) address of the peer, a universally unique identifier (UUID) for the peer, or some other identifier that differentiates the peer from others of peers 103. In some examples, connection information 121 may further indicate which service instance of service instances 102 is an endpoint to connections 111. Although, if portions of connection information 121 are received from respective ones of service instances 102, then connection balancer 101 may note the particular one of service instances 102 from which a portion was received as being the endpoint to the connections identified therein.

Based on the connection information, connection balancer 101 determines a subset of connections 111 for reestablishment on a per-peer basis using direction-dependent criteria (202). The criteria are direction-dependent in the sense that criteria used to determine whether a connection initiated by one of peers 103 should be included in the subset is different from criteria used to determine whether a connection initiated by one of service instances 102 is included in the subset, as described in more detail below. Connections initiated by peers 103 are referred to herein as inward connections because they were initiated by peers 103 towards service instances 102. Connections initiated by service instances 102 are referred to as outward connections because they were initiated by service instances 102 towards peers 103. In some examples, connections 111 may include only inward or only outward connections and that fact may not change as new connections are established. In those examples, connection balancer 101 may not be configured with the portion of the direction-dependent criteria that is not applicable to the type of connections being established (e.g., if only inward connections are handled, then connection balancer 101 may lack the portion of the direction-dependent criteria applicable to outward connections).

The direction dependent criteria are applied on a per-peer basis to mitigate service disruptions for individual peers. For instance, if the subset of connections was chosen at random without accounting for the peer in which the connections were established, then there is a greater risk that all of the connections with a given peer could be marked for termination. While terminated connections can be replaced with newly established connections, services will be disrupted during the time in which it takes for the peer to establish the new connections. In contrast, the direction-dependent criteria used by connection balancer 101 ensures that connections with a particular peer are not all included in the subset as being marked for termination. Similarly, to avoid disruption to newly established connections, the direction-dependent criteria may indicate that connections established after a most recent performance of operation 200 should automatically not be included in the subset.

Connection balancer 101 terminates the determined subset of connections 111 (203). To terminate the subset, connection balancer 101 may direct those of service instances 102 over communication links 112 to terminate the connections within the subset. Each service instance of service instances 102 that is an endpoint to at least one connection in the subset will receive a termination instruction from connection balancer 101. The termination instruction identifies the connection(s) that a respective service instance is to terminate. A connection may be identified based on a tuple for the connection (i.e., source IP address, source Port, destination IP address, destination port) or using some other identifying information that unambiguously identifies connections to be terminated. Upon a service instance receiving the termination instruction, the service instance terminates the connection(s) identified by the termination instruction. Preferably, the service instance gracefully terminates the connection by allowing exchanges for any ongoing transactions on the connection to complete prior to taking down the connection. Gracefully terminating the connection minimizes the disruption that may occur for the corresponding peer should a connection terminate in the middle of a transaction over that connection. In other examples, a service instance may terminate an identified connection without concern for ongoing transactions. In yet further examples, connection balancer 101 may indicate in its termination instruction whether connections should be gracefully terminated.

Once a connection is terminated, a new connection can be established to handle subsequent transactions that the terminated connection would have otherwise carried. Establishment of the new connection may occur immediately upon the previous connection being terminated or may wait until a later time, such as when a new transaction requires the new connection (if such a transaction arises). In some examples, connection balancer 101 may direct that a new connection be established before the previous connection is terminated. Then traffic can immediately switch to the new connection. While it is possible that the service instance of service instances 102 that will handle the new connection may be randomly or arbitrarily selected, active-active environment 131 preferably employs a load balancing mechanism to ensure the new connection is established with a service instance that improves the balance of connections 111 among service instances 102 (e.g., selects a service instance servicing fewer of connections 111 than others of service instances 102). For example, if the peer that was an endpoint to a terminated connection initiates a new connection, then a load balancer for active-active environment 131 may intercept a request for the new connection from the peer and direct the request to a selected one of service instances 102. A load balancing policy may guide the load balancer regarding how to distribute new connection requests. Similarly, if one of service instances 102 is to initiate the new connection with the peer, then a controller/orchestrator of active-active environment 131 may select which of service instances 102 should initiate the connection (i.e., send the connection request to the peer). A load balancing policy used by the controller/orchestrator may provide direction regarding how to distribute new connections and may also indicate when a new service instance should be added to service instances 102 to help handle the load of connections 111.

Advantageously, connection balancer 101 terminating the subset of connections 111 enables new connections replacing those terminated connections to be load balanced when being established. Mechanisms already in place for active-active environment 131 (e.g., a load balancer for incoming connection requests) may handle the load balancing. This effectively redistributes connections 111 among service instances 102 without requiring specialized logic to move existing connections from one service instance to another.

Figure 3:
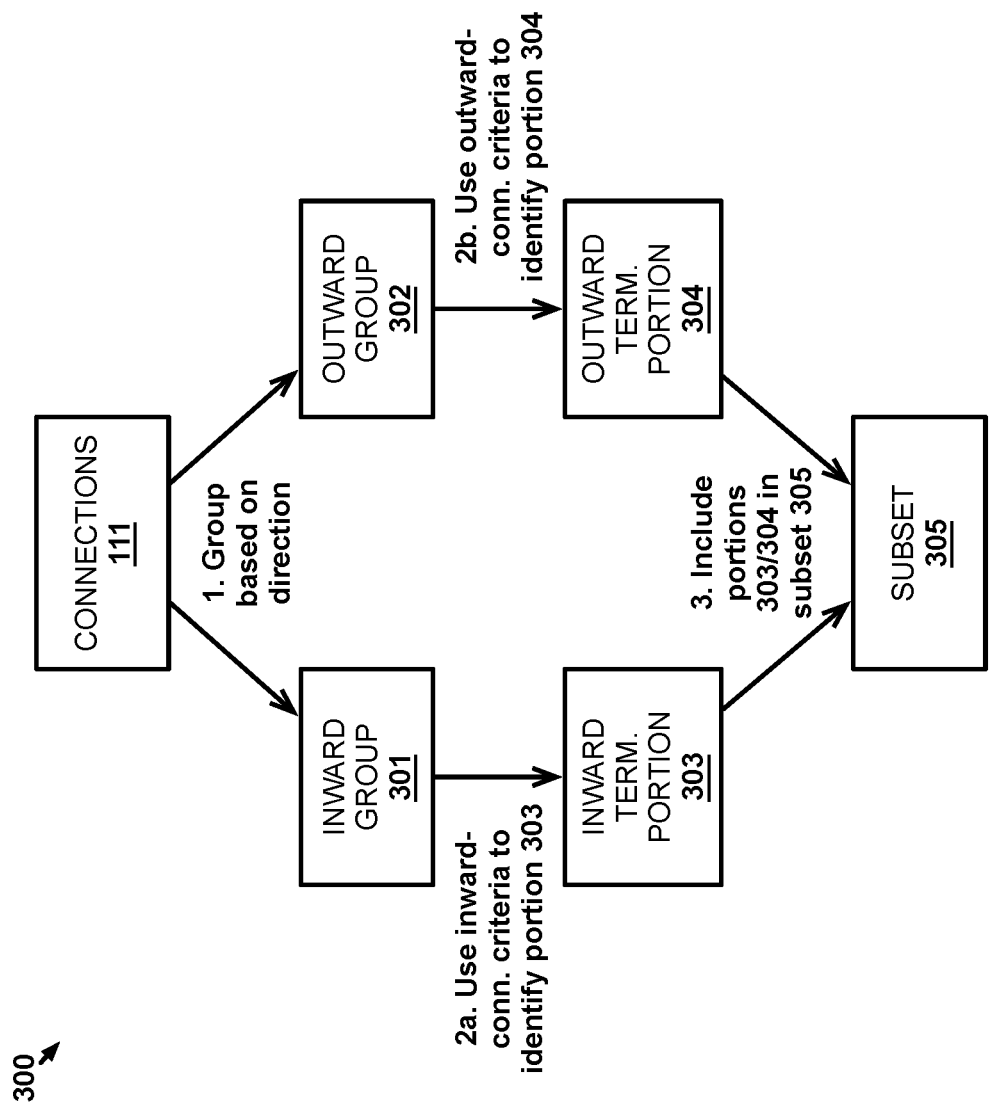
FIG. 3 illustrates an operational scenario for redistributing application-layer connections with peers between service instances.

FIG. 3 illustrates operational scenario 300 for redistributing application-layer connections with peers between service instances. Operational scenario 300 is an example of what may occur during step 202 of operation 200. In operational scenario 300, at step 1, connections 111 are grouped into inward group 301 and outward group 302 based on the direction of connection initiation for the respective connections in connections 111. Inward group 301 includes those of connections 111 that were initiated by peers 103 (e.g., with the involved service instances acting as HTTP or diameter servers) while outward group 302 includes those of connections 111 that were initiated by service instances 102 (e.g., with the involved service instances acting as HTTP or diameter clients). In other examples, grouping of connections 111 may be implicit in that connection balancer 101 simply recognizes in which direction a connection was initiated when applying direction-dependent criteria. For instance, connection balancer 101 may simply ignore outward connections when applying the portion of the direction-dependent criteria for inward connections.

At step 2a, connection balancer 101 uses the portion of the direction-dependent criteria for inward connections, referred to as the inward-connection criteria, to determine inward termination portion 303. Inward termination portion 303 includes connections in inward group 301 that the inward-connection criteria indicate should be terminated. Similarly, at step 2b, connection balancer 101 uses the portion of the direction-dependent criteria for outward connections, referred to as the outward-connection criteria, to determine outward termination portion 304. Outward termination portion 304 includes connections in outward group 302 that the outward-connection criteria indicate should be terminated. Steps 2a and 2b are performed at substantially the same time in operational scenario 300. In other examples, steps 2a and 2b may be performed in a different order, such as one after the other.

Both inward termination portion 303 and outward termination portion 304 are included in connection subset 305 at step 3. Connection subset 305 is the subset of connections 111 that connection balancer 101 has determined based on the direction-dependent criteria should be terminated. In accordance with operational scenario 300, connection subset 305 is the subset that connection balancer 101 terminates in step 203 of operation 200 described above. It should be understood that inward termination portion 303 and outward termination portion 304 are explained separately to show the differing criteria used for identifying connections for termination. As such, when identifying portions of inward group 301 and outward group 302 in steps 2a and 2b, the portions may be added directly to connection subset 305 without an intermediate step of creating inward termination portion 303 and outward termination portion 304.

Figure 4:
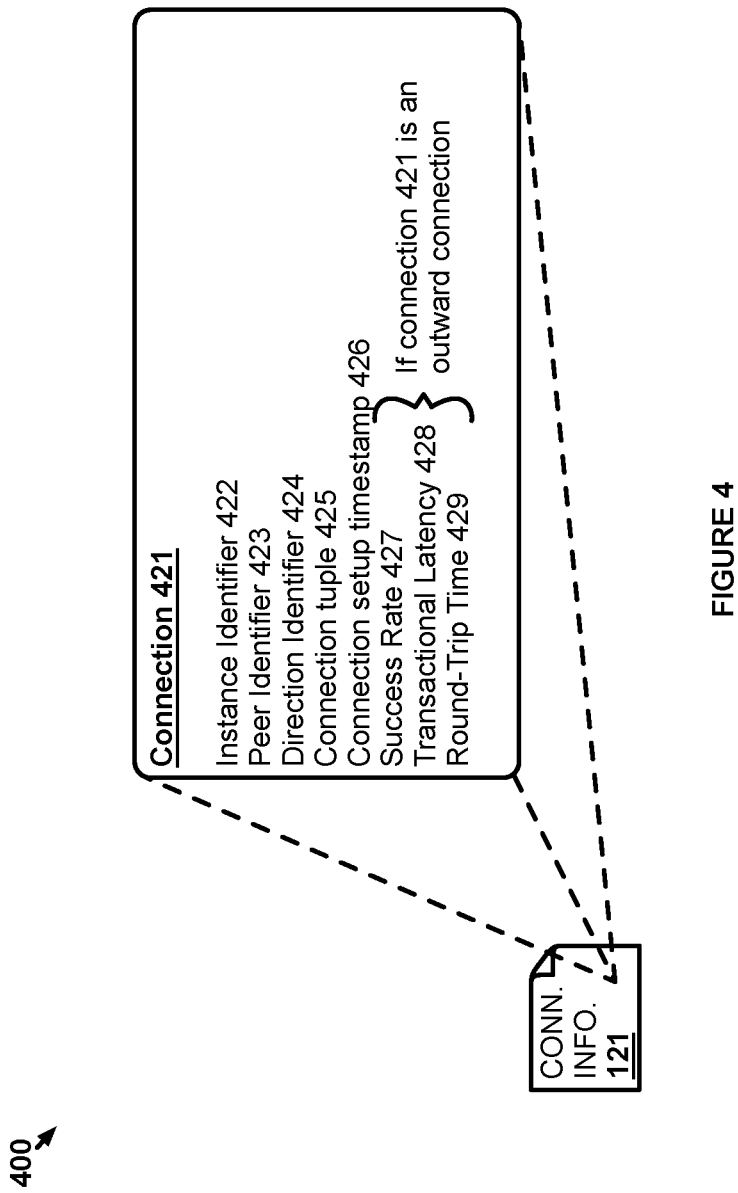
FIG. 4 illustrates an example of connection information used when redistributing application-layer connections with peers between service instances.

FIG. 4 illustrates exemplary connection information 400 used when redistributing application-layer connections with peers between service instances. Connection information 400 is an example of connection information included in connection information 121. Specifically, connection information 400 is connection information for connection 421. Connection information 121 may include similar information about the other connections of connections 111. Connection 421 includes instance identifier 422, peer identifier 423, direction identifier 424, connection tuple 425, and connection setup timestamp 426. Success rate 427, transactional latency 428, and round-trip time 429 are items of information relevant to identifying outward connections for outward termination portion 304 in the examples below. Connection information 400 may still include items 427-429 even if connection 421 is not an outward connection but that information is not relevant to the application of the inward-connection criteria in the examples below. Other examples may include different information for connection 421.

Instance identifier 422 identifies the service instance of service instances 102 that is an endpoint of connection 421. Instance identifier 422 may be an identifier assigned by active-active environment 131 to differentiate the service instance from others of service instances 102, may be a network address of the service instance, or may be some other type of identifier that differentiates the service instance of connection 421 from others of service instances 102. In some examples, connection information 400 may not explicitly include instance identifier 422 but connection balancer 101 may infer instance identifier 422 as being the service instance from which connection information 400 is received.

Peer identifier 423 similarly differentiates the peer of peers 103 that is the other endpoint of connection 421. Peer identifier 423 may be a FQDN of the peer, a network address of the peer, a UUID of the peer, or some other identifier that differentiates the peer from others of peers 103. In some examples, determining which peer is actually the endpoint to a particular connection may be non-trivial. This may be especially true for inward connections since the identity of the client initiating the connection is not always known. For instance, a form of network address translation may be enabled between the peer and the service instance of a connection. For 5G service based interfaces, an HTTP2 endpoint may use consumer information available as part of OAuth token (i.e., available in a sub attribute in token defined technical specification 29.510 by the 3rd Generation Partnership Project (3GPP) or available in other custom headers, such as those suggested in technical specification 29.500 by 3GPP). For diameter connections, peer details may be derived from diameter identity exchanged as part of a capabilities exchange request (CER) message.

Direction identifier 424 indicates the direction in which connection 421 was initiated. That is, direction identifier 424 indicates whether connection 421 was initiated by the peer (i.e., is an inward connection) or by the service instance (i.e., is an outward connection). Connection tuple 425 indicates a source IP address, source Port, destination IP address, and destination port of the connection. In some examples, instance identifier 422 and peer identifier 423 may not be necessary for separate inclusion in connection information 400 because the source IP address and destination IP address in connection tuple 425 are enough to identify the service instance and peer, respectively. Connection setup timestamp 426 indicates the time in which connection 421 was established.

Success Rate 427 is a measure of the number of requests transmitted over connection 421 relative to the number of successful responses to those requests over connection 421 (e.g., if 15 successful responses are transmitted relative to 20 requests, then success rate 427 would be 75%). Transactional latency 428 is the average processing time for responses to be transmitted for corresponding requests over connection 421. Round-trip time 429 indicates transport latency for messages exchanged with the peer identified by peer identifier 423 over connection 421. The round-trip time is the amount of time between sending a message and receiving acknowledgement that the message was received. Round-trip time 429 is an average of round-trip times measured for connection 421. The averages for the values described above may be determined over a predefined amount of time (e.g., a time period defined by a user, the time period since operation 200 was last performed, etc.) or a predefined number of messages (e.g., requests, replies, etc.). In some examples, connection balancer 101 may receive one or more of success rate 427, transactional latency 428, and round-trip time 429 from sources other than connection information 121 (e.g., connection balancer 101 may use observability tools or data analytical tools available in active-active environment 131).

Figure 5:
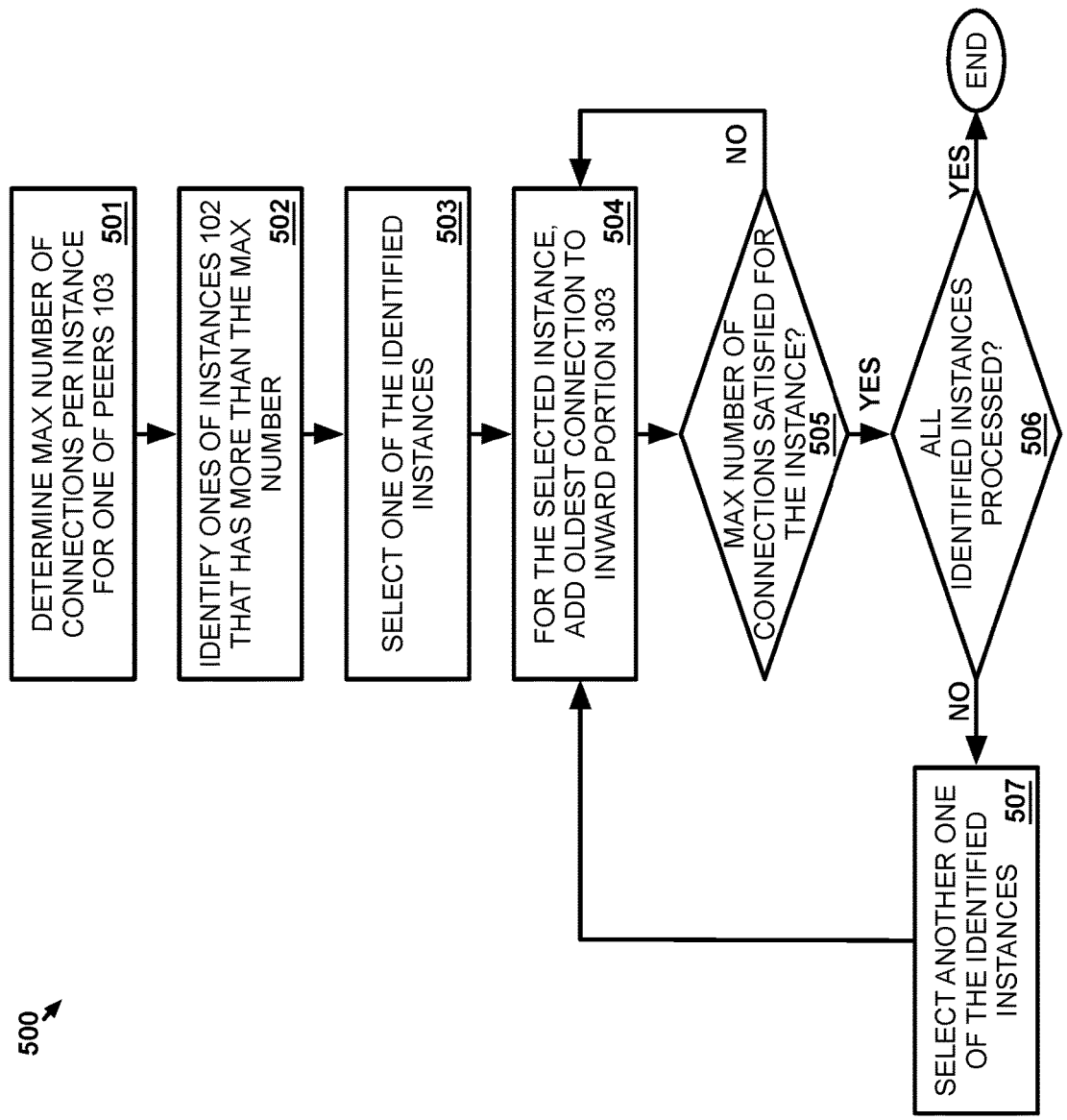
FIG. 5 illustrates an operation for redistributing application-layer connections with peers between service instances.

FIG. 5 illustrates operation 500 for redistributing application-layer connections with peers between service instances. Operation 500 is an example for how inward-connection criteria is used in step 2a of operational scenario 300 to identify inward connections for inclusion in inward termination portion 303. Operation 500 is performed on a per-peer basis. As such, the steps of operation 500 concern only a single peer of peers 103. Operation 500 is performed separately for the other peers of peers 103 (e.g., may be performed in parallel for respective peers of peers 103).

In operation 500, connection balancer 101 determines a maximum number of connections per instance for the peer of peers 103 subject to this performance of operation 500 (501). The maximum number of connections per instance is part of the inward-connection criteria in this example. The maximum number of connections per instance is the ceiling of a quotient of the total number of inward connections from the peer across service instances 102 divided by the number of service instances 102. The ceiling is a mathematical function that rounds up an input number to the nearest integer. The input number in this case is the aforementioned quotient. For example, if the total number of connections from the peer to service instances 102 is 15 and there are 10 of service instances 102, then the quotient would be 1.5. Applying the ceiling function to that quotient results in the maximum number of connections per instance being 2 since 2 is the nearest integer greater than 1.5. Thus, in that example, the 15 connections from the peer may be distributed in any manner across the 10 service instances 102 (including all connections being established with a single service instance) but there should only be a maximum of 2 connections per service instance.

Connection balancer 101 identifies which of service instances 102 have greater than the maximum number of connections per instance with the peer (502). Continuing the example above, connection balancer 101 would identify service instances that have more than two of the 15 connections with the peer. It is possible that no service instance is servicing more than the maximum number of connections per instance with the peer. In such cases, operation 500 ends for the peer. However, if one or more of service instances 102 are identified, connection balancer 101 selects one of the service instances 102 to continue operation 500 (503).

For the selected service instance, connection balancer 101 adds the oldest connection with the peer to inward termination portion 303. Connection age is determined from the connection setup timestamp (e.g., connection setup timestamp 426) for the connection in connection information 121. The oldest connection is added first in this example to avoid disrupting a newly established connection, which is preferable to avoid. However, other examples may add a connection regardless of age. After adding the connection, connection balancer 101 determines whether the maximum number of connections per instance is now satisfied for the selected interest (e.g., determines whether the number of connections between the peer and the selected service instance two per the above example) (505). If the maximum number of connections per instance is not satisfied, then operation 500 returns to step 504. During the subsequent performance of step 504, the oldest connection being added to inward termination portion 303 is the oldest remaining connection with the peer because older connections with the peer would have already been added to inward termination portion 303. Steps 504 and 505 repeat until the maximum number of connections per instance is satisfied.

Once the maximum number of connections per instance is satisfied, connection balancer 101 determines whether all service instances identified in step 502 have been processed (506). If the identified service instances have all been processed, then operation 500 ends with respect to the peer. If one or more service instances remain to be processed, then connection balancer 101 selects one of the unprocessed service instances (507). Operation 500 returns to step 504 to begin adding connections between the peer and the newly selected service instance to inward termination portion 303. Once operation 500 ends for the respective peer and the connections in inward termination portion 303 are subsequently terminated, no service instance of service instances 102 will have a number of inward connections with the peer greater than the maximum number of connections per instance (e.g., no service instance will have more than 2 connections with the peer per the example above). Should the peer request new connections to replace the terminated connections, the new connections can be load balanced between service instances 102. For instance, building off the above example where the maximum number of connections per instance was two, a load balancer of active-active environment 131 may operate using a policy that results in routing the new connection requests to those of service instances 102 that are not already handling two connections with the peer. Connection balancer 101 is, therefore, able to redistribute the peer's connections more evenly across service instances 102 without having to move existing connections.

Figure 6:
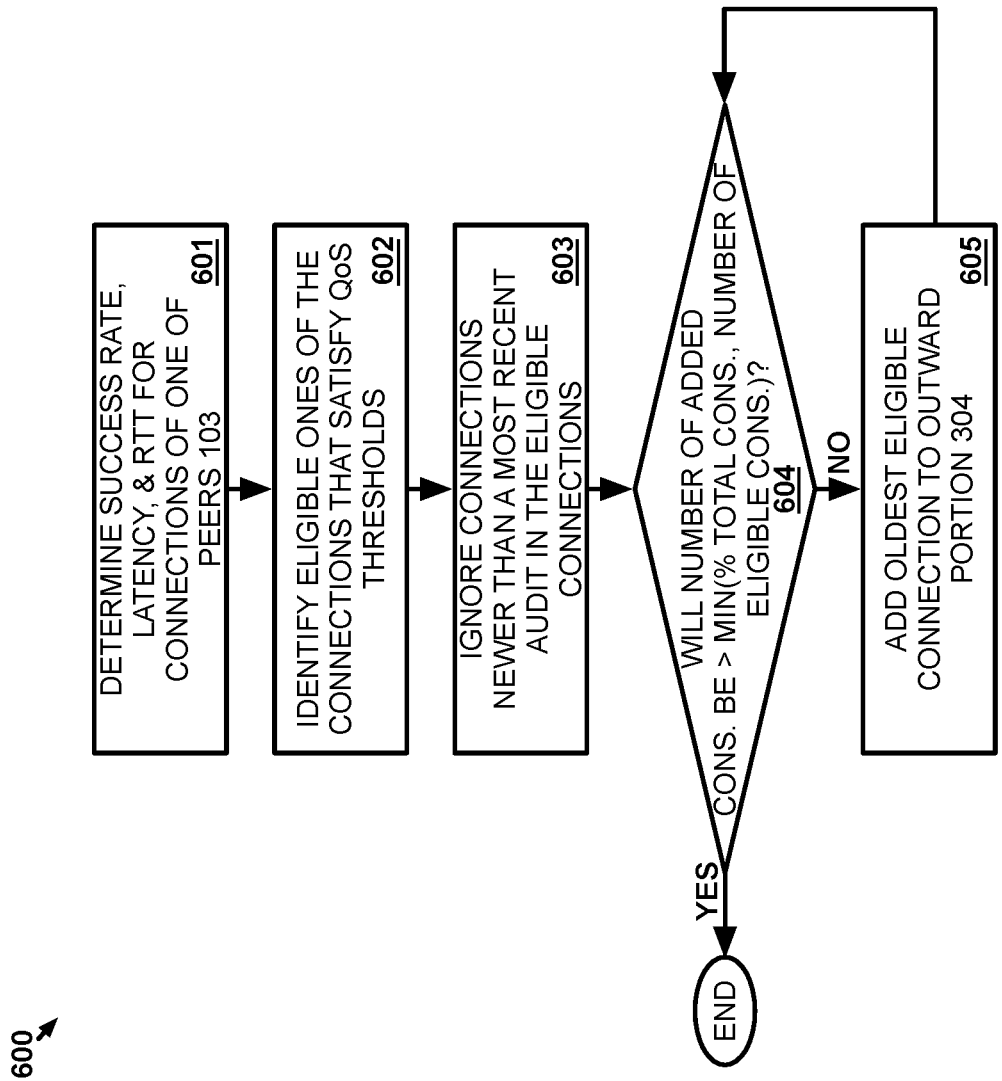
FIG. 6 illustrates an operation for redistributing application-layer connections with peers between service instances.

FIG. 6 illustrates operation 600 for redistributing application-layer connections with peers between service instances. Operation 600 is an example for how outward-connection criteria is used in step 2b of operational scenario 300 to identify outward connections for inclusion in outward termination portion 304. Operation 600 is performed on a per-peer basis. As such, the steps of operation 600 concern only a single peer of peers 103. Operation 600 is performed separately for the other peers of peers 103 (e.g., may be performed in parallel for respective peers of peers 103).

In operation 600, connection balancer 101 determines the success rate, transactional latency, and round-trip time for outward connections of the peer of peers 103 subject to this performance of operation 600 (601). While these three factors are determined for operation 600, other examples may use different factors, including fewer factors (e.g., only round-trip time), that indicate Quality of Service (QOS) over the connections. For instance, when an outward connection is being multiplexed, then success rate and transaction latency cannot be used because it is possible that congestion is occurring upstream rather than the next hop to which the service instance is connected. Thus, the success rate or transaction latency for a given connection may not be representative of the service instance's performance. For example, a fourth generation (4G) wireless network uses a diameter routing agent (DRA) and a 5G wireless network uses a service communication proxy (SCP) as an intervening hop between the service instance and the final endpoint (e.g., wireless client) to which a request on the outward connection is targeted. The service instance will be able to determine round-trip time between it and a next hop (e.g., the DRA or SCP) but the success rate and response latency depends on the final endpoint, which is beyond the next hop.

In this example, the outward-connection criteria include one or more QoS thresholds to which the success rate, transactional latency, and round-trip time are applied. Connection balancer 101 identifies termination-eligible connections from the outward connections of the peer that satisfy the QoS thresholds (602). In some examples, connection balancer 101 may aggregate the factors into a single value (e.g., by generating a score based on the values) and apply a single QoS threshold to that determined value. In other examples, a different QoS threshold may exist for each factor and each threshold may need to be satisfied for a connection to qualify as termination eligible. In some examples, only a portion of the multiple QoS thresholds may need to be satisfied (e.g., 2 out of the 3) for a connection to qualify as termination eligible. A threshold for round-trip time may be satisfied if the round-time is greater than a threshold amount of time, a threshold for the transactional latency may be satisfied if the transactional latency is greater than another amount of time, and a threshold for the success rate may be satisfied if the success rate is under a threshold percentage of success. The QoS thresholds may be user-configurable and enable a user, such as an administrator of connection balancer 101, to fine tune which outward connections satisfy the QoS thresholds. Even if a connection satisfies the QoS thresholds for being termination-eligible, connection balancer 101 ignores (i.e., excludes from being termination eligible) connections with timestamps indicating they are newer than the most recent previous performance of operation 200 (603). While it may be preferable to exclude the newer connections to not disrupt service that just recently started, other examples may not exclude the newer connections.

Connection balancer 101 then determines whether adding another termination-eligible connection to outward termination portion 304 result in the number of connections added to outward termination portion 304 exceeding the lesser of two values (604). The two values and the requirement that the lesser of the two be used in the determination are also part of the outward-connection criteria in operation 600. One of the two values is a predefined portion of the total number of connections with the peer and the other of the two values is the number of the termination-eligible connections. The predefined portion is a user-configurable parameter (e.g., by an administrator of connection balancer 101) that limits the portion of termination-eligible connections that can be terminated during an iteration of operation 200. The predefined portion may be expressed as a percentage or a ratio of outward connections. For example, the predefined portion may limit termination to only 80% of the outward connections for the peer. Since this is the first time through step 604 during operation 600, the number of connections added to outward termination portion 304 is zero and adding a termination-eligible connection to outward termination portion 304 would result in one added connection. Thus, unless the number of termination-eligible connections is zero or the predefined portion of the total number of connections with the peer less than one (which would end operation 600), connection balancer 101 proceeds with adding the oldest termination-eligible connection to outward termination portion 304 (605). Other examples may not consider age or may use a different age-based order (e.g., youngest first), when selecting termination eligible connections to add.

After adding the oldest termination-eligible connection to outward termination portion 304, connection balancer 101 returns to step 604. In this iteration of step 604, the number of added connections is now one, so connection balancer 101 determines whether adding another connection (i.e., which would result in two added connections) would exceed the lesser of the two values described above. If the lesser of the two values would be exceeded, then operation 600 ends for the peer. If, however, adding another connection would still not exceed the lesser of the two values, then connection balancer 101 again proceeds with step 605 to add the oldest termination-eligible connection to outward termination portion 304. For this and other subsequent iterations of step 605, the oldest termination-eligible connection is the oldest termination-eligible connection that has not already been added to outward termination portion 304. Connection balancer 101 then returns to step 604 to again determine whether adding another termination-eligible connection would exceed the lesser of the two values. Steps 604 and 605 repeat until adding another connection would exceed the lesser of the two values (i.e., operation 600 stops before adding a termination-eligible connection that would cause the number of added termination-eligible connections to exceed the lesser of the two values).

In a specific example of operation 600, connection balancer 101 may identify 12 termination-eligible connections for a peer of peers 103. The peer may have 15 total connections with service instances 102 and the predefined portion of the total number of connections may be set at 70%. 70% of 15 is 10.5. 10.5 is the lesser of the values 10.5 and 12. Steps 604 and 605 will, therefore, repeat until the number of added termination-eligible connections reaches 10 because, at step 604, connection balancer 101 determines that addition of another termination-eligible connection (i.e., to total 11 added connections) would exceed 10.5.

Figure 7:
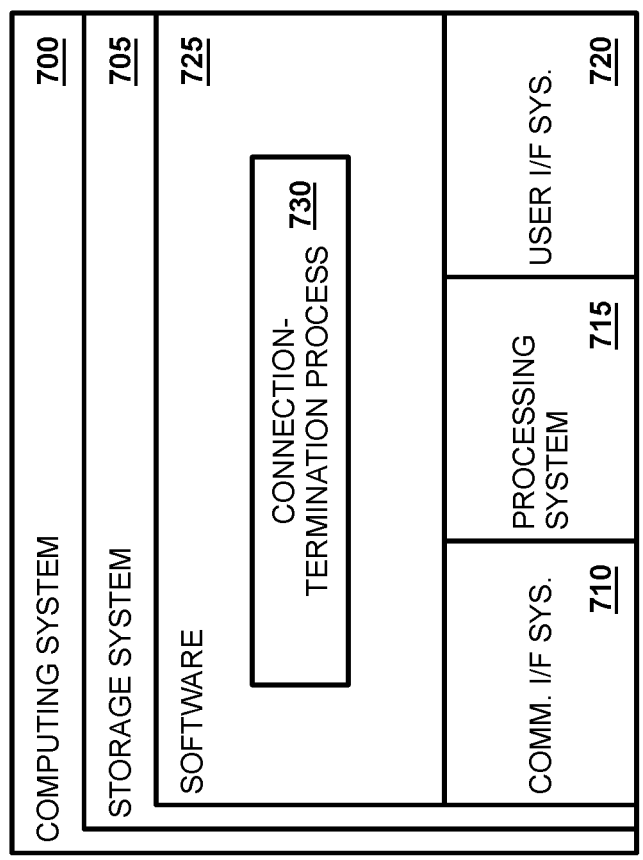
FIG. 7 illustrates a computing system for redistributing application-layer connections with peers between service instances.

FIG. 7 illustrates a computing system 700 that is representative of any system or collection of systems in which the various processes, systems, programs, services, and scenarios disclosed herein may be implemented. Examples of computing system 700 include, but are not limited to, desktop computers, laptop computers, server computers, routers, web servers, cloud computing platforms, and data center equipment, distributed computing systems, as well as any other type of physical or virtual server machine, physical or virtual router, container, and any variation or combination thereof.

Computing system 700 may be implemented as a single apparatus, system, or device or may be implemented in a distributed manner as multiple apparatuses, systems, or devices. Computing system 700 may include, but is not limited to, processing system 715, storage system 705, software 725, communication interface system 710, and user interface system 720. Processing system 715 may be operatively coupled with storage system 705, communication interface system 710, and user interface system 720.

Processing system 715 may load and execute software 725 from storage system 705. Software 725 may include and implement connection-termination process 730, which may be representative of any of the operations for selectively terminating application-layer connections using direction-dependent criteria (e.g., operation 200), including the selection of inward connections (e.g., operation 500) and outward connections (e.g., operation 600), and the like. Accordingly, computing system 700 may be connection balancer 101 or may be a host system for a virtualized example of connection balancer 101. Computing system 700 may also represent service instances 102 and peers 103 or may host virtualized examples of service instances 102 and peers 103—including combinations thereof. When executed by processing system 715, software 725 may direct processing system 715 to operate as described herein for at least the various processes, operational scenarios, and sequences discussed in the foregoing implementations. Computing system 700 may optionally include additional devices, features, or functionality not discussed for purposes of brevity.

In some embodiments, processing system 715 may comprise a micro-processor and other circuitry that retrieves and executes software 725 from storage system 705. Processing system 715 may be implemented within a single processing device but may also be distributed across multiple processing devices or sub-systems that cooperate in executing program instructions. Examples of processing system 715 may include general purpose central processing units, graphical processing units, application specific processors, and logic devices, as well as any other type of processing device, combinations, or variations thereof.

Storage system 705 may comprise any memory device or computer readable storage media readable by processing system 715 and capable of storing software 725. Storage system 705 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a transitory form of signal transmission (often referred to as "signals per se"), such as a propagating electrical or electromagnetic signal or carrier wave.

In addition to computer readable storage media, in some implementations storage system 705 may also include computer readable communication media over which at least some of software 725 may be communicated internally or externally. Storage system 705 may be implemented as a single storage device but may also be implemented across multiple storage devices or sub-systems co-located or distributed relative to each other. Storage system 705 may comprise additional elements, such as a controller, capable of communicating with processing system 715 or possibly other systems.

Software 725 (including connection-termination process 730 among other functions) may be implemented in program instructions may, when executed by processing system 715, direct processing system 715 to operate as described with respect to the various operational scenarios, sequences, and processes illustrated herein. For example, software 725 may include program instructions for determining connection information about connections established with active-active service instances (e.g., information identifying directions of connection initiation for the connections and peers for the connections), using the connection information as a basis to determine a subset of the connections for reestablishment on a per-peer basis using direction-dependent criteria, and terminating the subset of the connections.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multithreaded, or in accordance with any other suitable execution paradigm, variation, or combination thereof. Software 725 may include additional processes, programs, or components, such as operating system software, virtualization software, or other application software. Software 725 may also comprise firmware or some other form of machine-readable processing instructions executable by processing system 715.

In general, software 725 may, when loaded into processing system 715 and executed, transform a suitable apparatus, system, or device (of which computing system 700 is representative) overall from a general-purpose computing system into a special-purpose computing system customized to act, for example, as a connection balancer or the like as described herein. Indeed, encoding software 725 on storage system 705 may transform the physical structure of storage system 705. The specific transformation of the physical structure may depend on various factors in different implementations of this description. Examples of such factors may include, but are not limited to, the technology used to implement the storage media of storage system 705 and whether the computer-storage media are characterized as primary or secondary storage, as well as other factors.

For example, if the computer readable storage media are implemented as semiconductor-based memory, software 725 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 710 may include communication connections and devices that allow for communication with other computing systems (not shown) over communication networks (not shown). Examples of communication connections and devices that together allow for inter-system communication may include network interface cards, antennas, power amplifiers, radio-frequency (RF) circuitry, transceivers, and other communication circuitry. The communication connections and devices may communicate over communication media to exchange communications with other computing systems or networks of systems, such as metal, glass, air, or any other suitable communication media.

Communication between computing system 700 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

Unless the context clearly requires otherwise, throughout the description and the claims, the words "comprise." "comprising." and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or." in reference to a list of two or more items, covers all the following interpretations of the word: any of the items in the list, all the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method for redistributing application-layer connections among active-active service instances, the method comprising:
   determining connection information about connections established with service instances operating in an active-active configuration, wherein the connection information identifies directions of connection initiation for the connections and identifies peers for the connections;
   based on the connection information, determining a subset of the connections for reestablishment on a per-peer basis using direction-dependent criteria; and
   terminating the subset of the connections.

2. The method of claim 1, wherein determining the subset of the connections comprises:
   grouping a portion of the connections into an inward group based on the directions of connection initiation, wherein the inward group includes inward connections initiated from the peers;
   identifying a portion of the inward group for termination based on inward-connection criteria of the direction-dependent criteria; and
   including the portion of the inward group in the subset of the connections.

3. The method of claim 2, wherein identifying the portion of the inward group comprises:
   for respective peers of the inward connections:
      determining a maximum number of connections per instance for a respective peer, wherein the maximum number of connections per instance comprises a ceiling of a quotient of a total number of connections from the respective peer across the service instances divided by a number of the service instances;
      identifying one or more instances of the service instances that include greater than the maximum number of connections per instance with the respective peer; and
      adding one or more termination-eligible connections between the one or more instances and the respective peer to the portion of the inward group until the one or more instances satisfy the maximum number of connections per instance.

4. The method of claim 3, wherein adding the one or more termination-eligible connections comprises:
   for respective instances of the one or more instances:
      adding the one or more termination-eligible connections in order of oldest first until the maximum number of connections per instance is reached, wherein the connection information indicates ages of the connections.

5. The method of claim 1, wherein determining the subset of the connections comprises:
   grouping a portion of the connections into an outward group based on the directions of connection initiation, wherein the outward group includes outward connections initiated from the service instances;
   identifying a portion of the outward group for termination based on outward-connection criteria of the direction-dependent criteria; and
   including the portion of the outward group in the subset of the connections.

6. The method of claim 5, wherein identifying the portion of the outward group comprises:
   for respective peers of the outward connections:
      identifying termination-eligible connections in the outward group between a respective peer and the service instances that satisfy one or more Quality of Service (QoS) thresholds in the outward-connection criteria; and adding one or more of the termination-eligible connections to the portion of the outward group until addition of another termination-eligible connection would result in a number of the one or more of the termination-eligible connections exceeding a lesser of two values, wherein the two values comprise a predefined portion of total connections with the respective peer and a number of the termination-eligible connections.

7. The method of claim 6, wherein the one or more QoS thresholds include at least one of a success rate threshold, an average latency threshold, and a round-trip time (RTT) threshold, and wherein the connection information indicates a success rate, an average latency, and a RTT for the connections.

8. The method of claim 6, wherein the one or more of the termination-eligible connections are added in order of oldest first.

9. The method of claim 6, wherein the termination-eligible connections do not include ones of the outward connections that were established since terminating a previously determined subset of connections.

10. The method of claim 1, comprising:
querying an instance orchestrator to identify the service instances,
wherein determining the connection information comprises polling the service instances for the connection information.

11. An apparatus for redistributing application-layer connections among active-active service instances, the apparatus comprising:
one or more computer readable storage media;
a processing system operatively coupled with the one or more computer readable storage media; and
program instructions stored on the one or more computer readable storage media that, when read and executed by the processing system, direct the apparatus to:
determine connection information about connections established with service instances operating in an active-active configuration, wherein the connection information identifies directions of connection initiation for the connections and identifies peers for the connections;
based on the connection information, determine a subset of the connections for reestablishment on a per-peer basis using direction-dependent criteria; and
terminate the subset of the connections.

12. The apparatus of claim 11, wherein to determine the subset of the connections, the program instructions direct the processing system to:
group a portion of the connections into an inward group based on the directions of connection initiation, wherein the inward group includes inward connections initiated from the peers;
identify a portion of the inward group for termination based on inward-connection criteria of the direction-dependent criteria; and
include the portion of the inward group in the subset of the connections.

13. The apparatus of claim 12, wherein to identify the portion of the inward group, the program instructions direct the apparatus to:
for respective peers of the inward connections:
determine a maximum number of connections per instance for a respective peer, wherein the maximum number of connections per instance comprises a ceiling of a quotient of a total number of connections from the respective peer across the service instances divided by a number of the service instances;
identify one or more instances of the service instances that include greater than the maximum number of connections per instance with the respective peer; and
add one or more termination-eligible connections between the one or more instances and the respective peer to the portion of the inward group until the one or more instances satisfy the maximum number of connections per instance.

14. The apparatus of claim 13, wherein to add the one or more termination-eligible connections, the program instructions direct the apparatus to:
for respective instances of the one or more instances:
add the one or more termination-eligible connections in order of oldest first until the maximum number of connections per instance is reached, wherein the connection information indicates ages of the connections.

15. The apparatus of claim 11, wherein to determine the subset of the connections, the program instructions direct the apparatus to:
group a portion of the connections into an outward group based on the directions of connection initiation, wherein the outward group includes outward connections initiated from the service instances;
identify a portion of the outward group for termination based on outward-connection criteria of the direction-dependent criteria; and
include the portion of the outward group in the subset of the connections.

16. The apparatus of claim 15, wherein to identify the portion of the outward group, the program instructions direct the apparatus to:
for respective peers of the outward connections:
identify termination-eligible connections in the outward group between a respective peer and the service instances that satisfy one or more Quality of Service (QoS) thresholds in the outward-connection criteria; and
add one or more of the termination-eligible connections to the portion of the outward group until addition of another termination-eligible connection would result in a number of the one or more of the termination-eligible connections exceeding a lesser of two values, wherein the two values comprise a predefined portion of total connections with the respective peer and a number of the termination-eligible connections.

17. The apparatus of claim 16, wherein the one or more QoS thresholds include at least one of a success rate threshold, an average latency threshold, and a round-trip time (RTT) threshold, and wherein the connection information indicates a success rate, an average latency, and a RTT for the connections.

18. The apparatus of claim 16, wherein the one or more of the termination-eligible connections are added in order of oldest first.

19. The apparatus of claim 16, wherein the termination-eligible connections do not include ones of the outward connections that were established since terminating a previously determined subset of connections.

20. One or more computer-readable storage media having program instructions stored thereon for redistributing application-layer connections among active-active service instances, the program instructions, when read and executed by a processing system, direct the processing system to:
   determine connection information about connections established with service instances operating in an active-active configuration, wherein the connection information identifies directions of connection initiation for the connections and identifies peers for the connections;
   based on the connection information, determine a subset of the connections for reestablishment on a per-peer basis using direction-dependent criteria; and
   terminate the subset of the connections.

* * * * *